8905X
N. Ayer,
Crimping Machine,
Patented June 19, 1835.
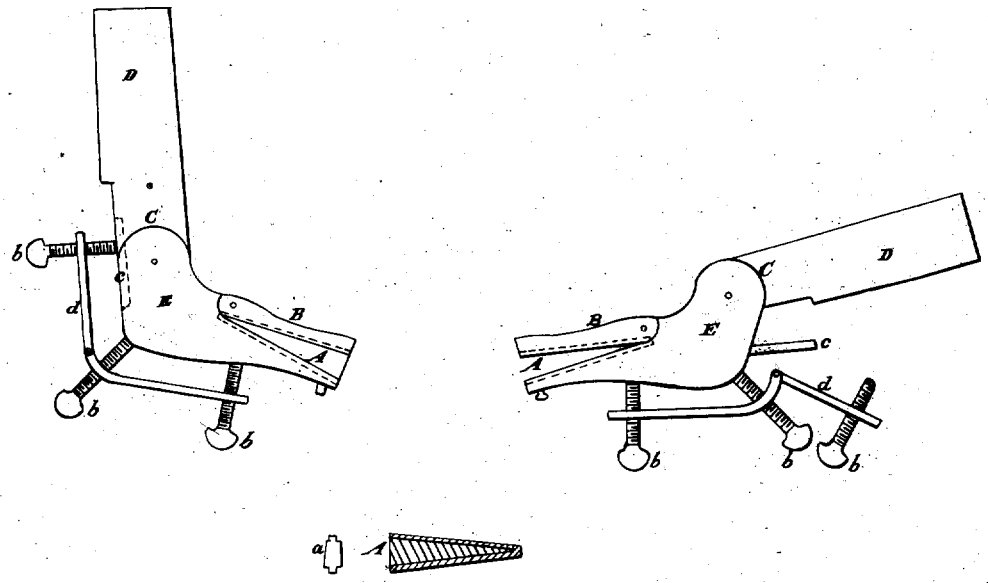
N. PETERS, PHOTO-LITHOGRAPHER, WASHINGTON, D. C.

June 19 1835 477

Nathan Ayer

8905 X Letters Patent

The Schedule referred to in these Letters Patent and making
part of the same, containing a description in the words of the said
Nathaniel Ayer himself of his improvement in the mode of
making or Manufacturing Boots by an instrument called
the Hinge Boot Cramp.

To all to whom these presents shall come.
Be it known that I Nathaniel Ayer of St Johnsbury in the County of
Caledonia and State of Vermont, have invented a new and useful
improvement in the mode of making or manufacturing Boots by an
instrument called "the Hinge Boot Cramp" and that the following
is a full and exact description thereof viz. The main part of the "Hinge
Boot cramp" is formed of hard wood or other suitable materials of
an inch in thickness more or less & of sufficient depth for the front
of the Boot. the foot and leg being united by a joint where the human
foot and leg are. This joint may be constructed by a semicircular con=
cavity or convexity in the leg or foot, and the reverse in the other at
or about the place for the ancle joint. there may be a convexity in con
cave part to be inserted as a tongue in a concavity of the convex part
and fastened by a pin passing the centre of the arc of the circle for=
ming said joint, or instead of the above mode a metallic plate
with suitable shanks or other fastenings may be inserted, or said
joint may be made in any manner now known of. In the instep
of the foot is another joint formed to sever the foot in two parts
to the toe for the purpose of inserting a wedge or to be operated
upon by a screw or lever to assist in the cramping when the powers
hereinafter named shall be put in operation. This wedge may have [illegible]
or other fastenings to match into grooves or other suitable places in the
cramps to prevent it from slipping when the instrument operates.

The

478.

8905X

The foot part of said Hinge Boot Cramp is on either side champered
nearly to an edge — On the bottom of the foot may be inlaid a plate
of metallic or other hard substance for a screw hereinafter named to play
against. also around the heal is a plate of iron or other metal in
which is fastened the end of a screw which operates as a purchase at
that point — In the lower part of the back of said cramp is a cut
equal in depth to a plate of iron or other metal, which is attached
to said cramp by the last named screw, upon the bottom of the foot
and back of the leg having in it a joint near the heal where it is
fastened and loose at other end with screws at each end,
through said iron to force said foot and leg into their proper places,
and press said iron outwards which will operate upon the leather as
wished for. In the back part of said cramp is a groove in the cut
in which is inserted a tongue or latch to keep the cramp erect
when placed so — and also to serve for a bed piece for the
screw in that part of the instrument to operate against with
out injury. The screws may be made of iron or other metalic
or the whole instrument may be made of metalic substance or of wood or stone
substances or of wood or stone, or of any durable material of
which it is capable of being made — The foregoing is substan
tially a description of the instrument. Its peculiar utility and
improvement is shewn in its application to use. Having
suitably blocked out the leather to be cramped — throw the leg
and foot of the cramp by means of the hinge as near as
may be in a straight line, fasten the leather around it in
the proper place by slightly sewing the opposite edges then
raise the leg and latch it, insert the wedge at the toe
then by turning the screws on the bottom of the foot at the
heel and back — the leather to be cramped will be imme
diately compressed into the desired shape. In Testimony
whereof and that the above is a true specification of my said
improvement as above described I have hereunto set my hand
Exd. and seal this 23rd day of April 1835

W.G.C. Witnesses
Jery Dickerman
Joseph Hutchinson (Sealed [illegible] June 19. 1835)

Nathan Ayer.

J. D[illegible]

(Drawing)